United States Patent
Logan (10) Patent No.: US 10,486,726 B1
(45) Date of Patent: Nov. 26, 2019

(54) MOTORIZED COOLER CART

(71) Applicant: Ray Logan, Rock Hill, SC (US)

(72) Inventor: Ray Logan, Rock Hill, SC (US)

( * ) Notice: Subject to any disclaimer, the term of this patent is extended or adjusted under 35 U.S.C. 154(b) by 0 days.

(21) Appl. No.: 15/422,111

(22) Filed: Feb. 1, 2017

(51) Int. Cl.
| | |
|---|---|
| *B62B 5/00* | (2006.01) |
| *B62B 1/12* | (2006.01) |
| *B62B 1/14* | (2006.01) |
| *A45C 9/00* | (2006.01) |
| *B60L 53/16* | (2019.01) |

(52) U.S. Cl.
CPC .............. *B62B 5/0046* (2013.01); *A45C 9/00* (2013.01); *B60L 53/16* (2019.02); *B62B 1/125* (2013.01); *B62B 1/14* (2013.01); *B62B 5/0053* (2013.01); *B62B 5/0069* (2013.01); *A45C 2009/002* (2013.01); *B62B 2204/06* (2013.01)

(58) Field of Classification Search
CPC ....... B62B 5/0073; B62B 5/0033; B62B 1/24; B65D 81/3813
See application file for complete search history.

(56) References Cited

U.S. PATENT DOCUMENTS

| | | | | |
|---|---|---|---|---|
| 4,932,677 A | * | 6/1990 | Shustack | A45C 5/14 280/28.5 |
| 5,100,198 A | | 3/1992 | Baltzell | |
| 5,209,009 A | * | 5/1993 | Fast | A01K 97/10 43/21.2 |
| 5,407,218 A | * | 4/1995 | Jackson | A45C 5/14 280/30 |
| 5,657,828 A | * | 8/1997 | Nagamachi | B60L 11/1805 180/168 |
| 5,732,786 A | * | 3/1998 | Fujigaki | A61G 5/045 180/19.3 |
| 6,276,219 B1 | * | 8/2001 | Kube | B60L 15/20 73/862.391 |
| 6,276,471 B1 | * | 8/2001 | Kratzenberg | B60L 11/18 180/19.1 |
| 6,318,740 B1 | * | 11/2001 | Nappo | B62B 3/00 280/47.35 |
| 6,422,747 B2 | * | 7/2002 | Akutsu | A61B 6/4405 180/19.1 |
| 6,497,424 B2 | | 12/2002 | Gartner et al. | |
| 6,502,656 B2 | * | 1/2003 | Weiss | A45C 5/14 180/168 |
| 6,871,715 B1 | * | 3/2005 | Diaz Carmena | B60L 11/1805 180/65.51 |

(Continued)

*Primary Examiner* — Tony H Winner
*Assistant Examiner* — Michael R Stabley (57) ABSTRACT

A motorized cooler cart including a wheeled parallelepiped insulated cooler body with a housing compartment disposed on a rear side thereof which contains a rechargeable battery, a retractable power cord in operational communication with the battery, and a drive gear motor in operational communication with the wheels. A telescopic handle is retractable and alternately extendible from the housing compartment. When the handle is extended, a speed control switch disposed on the handle and the drive gear motor are activated to rotate the wheels. The user only guides the cooler body. The present device also includes carrying handles, a cushioned seat atop a hinged lid, a foldable backrest, an electrical outlet on the rear side, cup holders extendible from channels in the lid, a rod holder, at least one storage pouch, and a dry storage tray. A pair of armrests is also provided.

13 Claims, 5 Drawing Sheets

(56) References Cited

U.S. PATENT DOCUMENTS

| | | | |
|---|---|---|---|
| D516,869 S * | 3/2006 | Beal | D21/423 |
| 7,347,100 B2 * | 3/2008 | Murakami | G01L 5/22 |
| | | | 414/4 |
| 7,407,032 B1 | 8/2008 | Chambers et al. | |
| 7,798,886 B1 * | 9/2010 | Williamson | B62D 51/007 |
| | | | 446/456 |
| 7,806,552 B1 * | 10/2010 | St. Julien | A45C 15/06 |
| | | | 362/154 |
| 8,327,961 B2 * | 12/2012 | Arpino | B62B 3/001 |
| | | | 180/19.1 |
| 8,672,081 B2 * | 3/2014 | Kume | B62B 5/0026 |
| | | | 180/19.1 |
| 8,706,332 B2 * | 4/2014 | Kume | B62B 3/001 |
| | | | 180/19.3 |
| 9,027,722 B1 * | 5/2015 | Parker | A45C 5/14 |
| | | | 190/102 |
| 9,278,704 B2 * | 3/2016 | Cates | B62B 5/0089 |
| 9,462,796 B1 * | 10/2016 | Ellis | A01K 97/22 |
| 2004/0238241 A1 * | 12/2004 | Mitchell, Jr. | B62B 3/001 |
| | | | 180/19.3 |

* cited by examiner

MOTORIZED COOLER CART

BACKGROUND OF THE INVENTION

Various types of wheeled thermal coolers are known in the prior art. However, what is needed, and what the present device provides, is a motorized cooler cart including a cooler body, a housing compartment on a rear side thereof which contains a rechargeable battery, a retractable power cord, and a drive gear motor which power a pair of wheels and a retractable handle with a speed control thereon for controlling the speed of the wheel. In addition, a plethora of accessories is needed including a cushioned seat atop a hinged lid, a foldable backrest, a pair of armrests, and an electrical outlet on the cooler body along with cup holders extendible from the lid and various structures for holding items such as personal belongings and a fishing rod.

FIELD OF THE INVENTION

The present invention relates to thermal coolers, and more particularly, to a motorized cooler cart.

SUMMARY OF THE INVENTION

The general purpose of the present motorized cooler cart, described subsequently in greater detail, is to provide a motorized cooler cart which has many novel features that result in a motorized cooler cart which is not anticipated, rendered obvious, suggested, or even implied by prior art, either alone or in combination thereof.

To accomplish this, the motorized cooler cart includes a wheeled parallelepiped insulated cooler body having a lid disposed thereon and a lockable latch assembly. A footing support member assists in maintaining the cooler body in a balanced upright position. A housing compartment is disposed on a rear side of the cooler body contains a rechargeable battery, a retractable power cord in operational communication with the battery, and a drive gear motor in operational communication with the wheels. A telescopic handle is retractable and alternately extendible from the housing compartment. When the handle is extended, a speed control switch disposed on the handle and the drive gear motor are activated, thus requiring the user to only guide the cooler body. A pair of carrying handles is provided for manually moving the cooler body from one location to another location. A cushioned parallelepiped seat atop the lid and a foldable backrest are also provided. An electrical outlet is disposed the rear side of the cooler body proximal the housing compartment and is in operational communication with the battery. A dry storage tray is supported atop an insulated lower support body continuously disposed along an outer perimeter of the interior compartment. A pair of cup holder is extendible from channels within the lid. A hollow rod holder is disposed on at least one of the right side and the left side of the cooler body for holding items such as a fishing rod or an umbrella. At least one storage pouch for holding personal belongings is disposed on at least one of the right side and the left side of the cooler body. A pair of armrests is also provided. Thus has been broadly outlined the more important features of the present motorized cooler cart so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
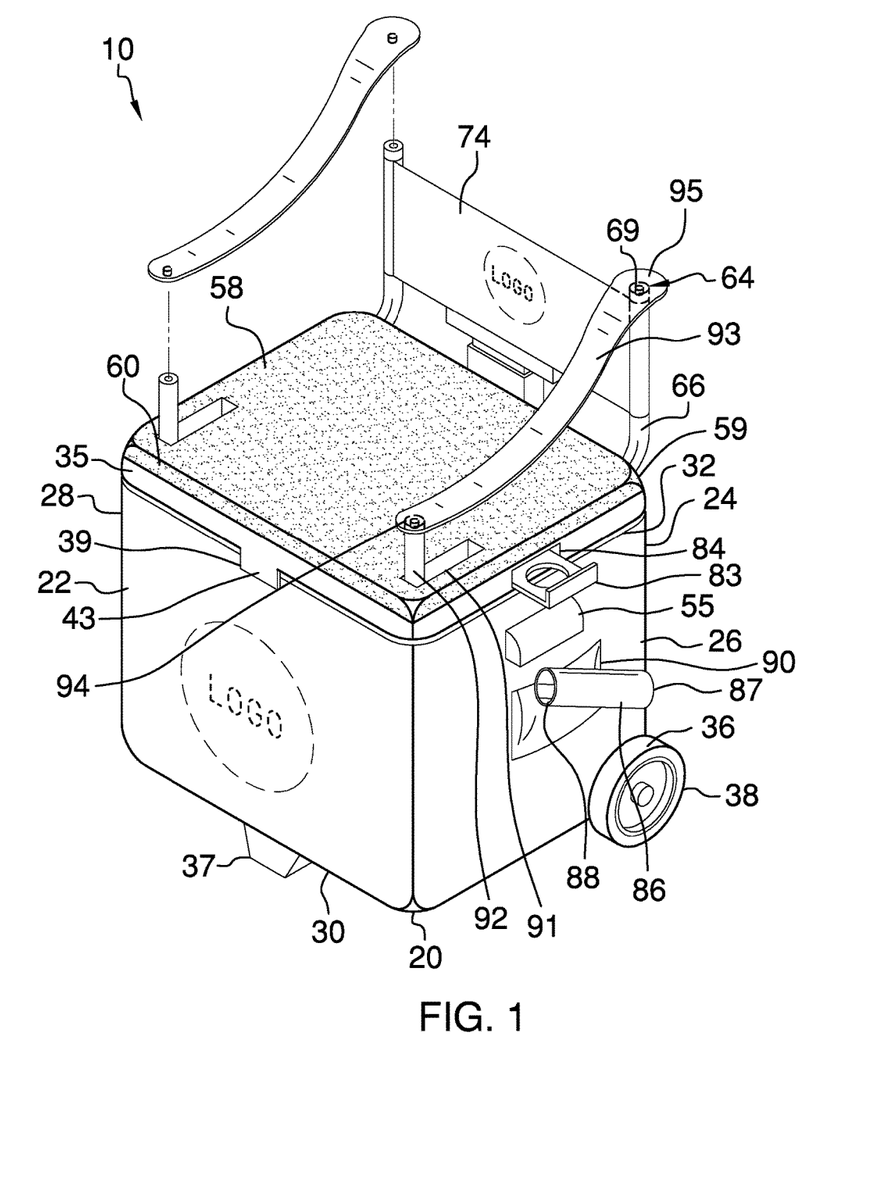
FIG. 1 is an isometric view in a closed condition.
Figure 2:
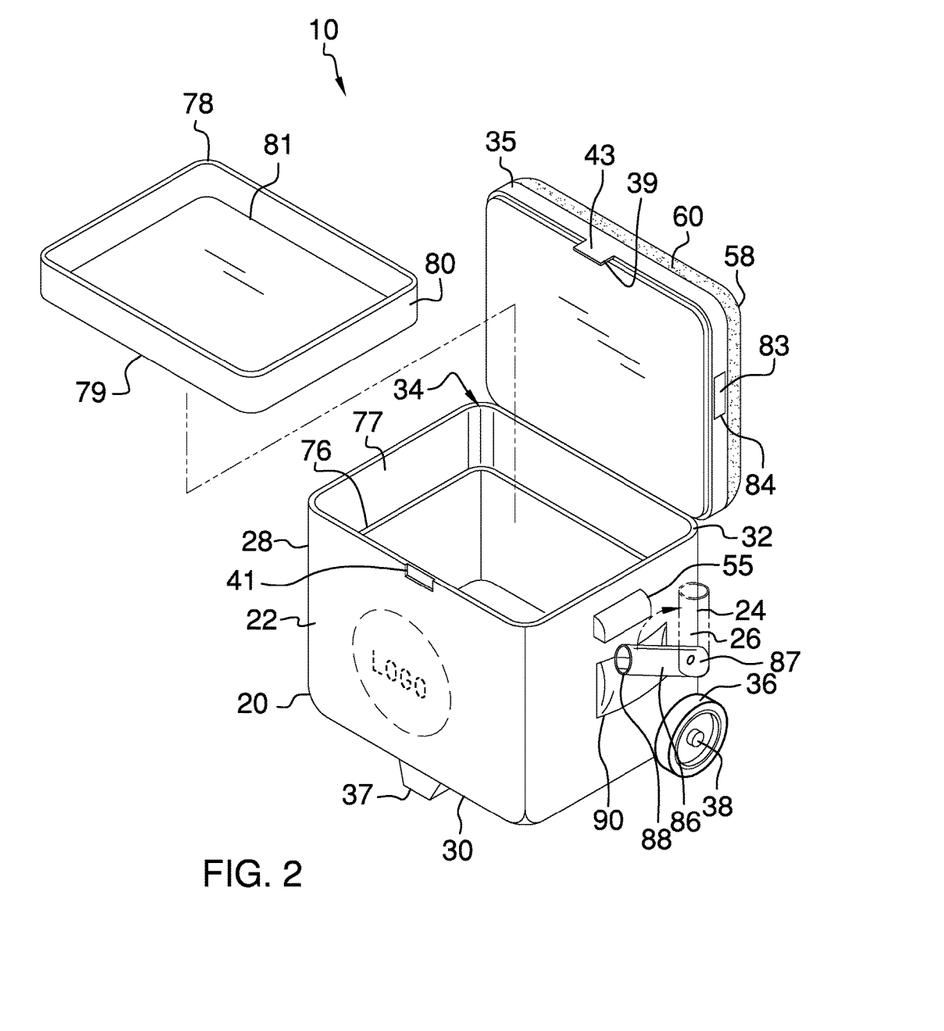
FIG. 2 is an exploded isometric view in an open condition showing a tray insertable into an interior compartment of a cooler body.
Figure 3:
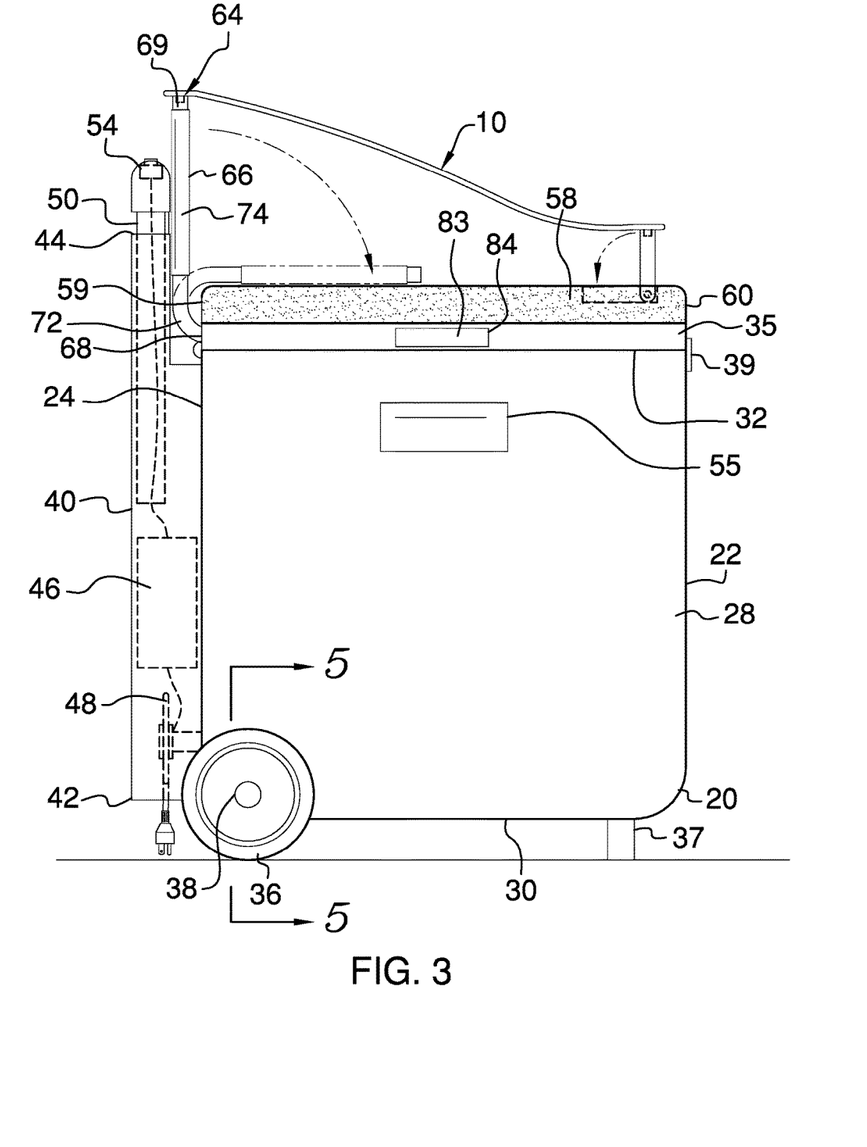
FIG. 3 is a side elevation view in the closed condition.
Figure 4:
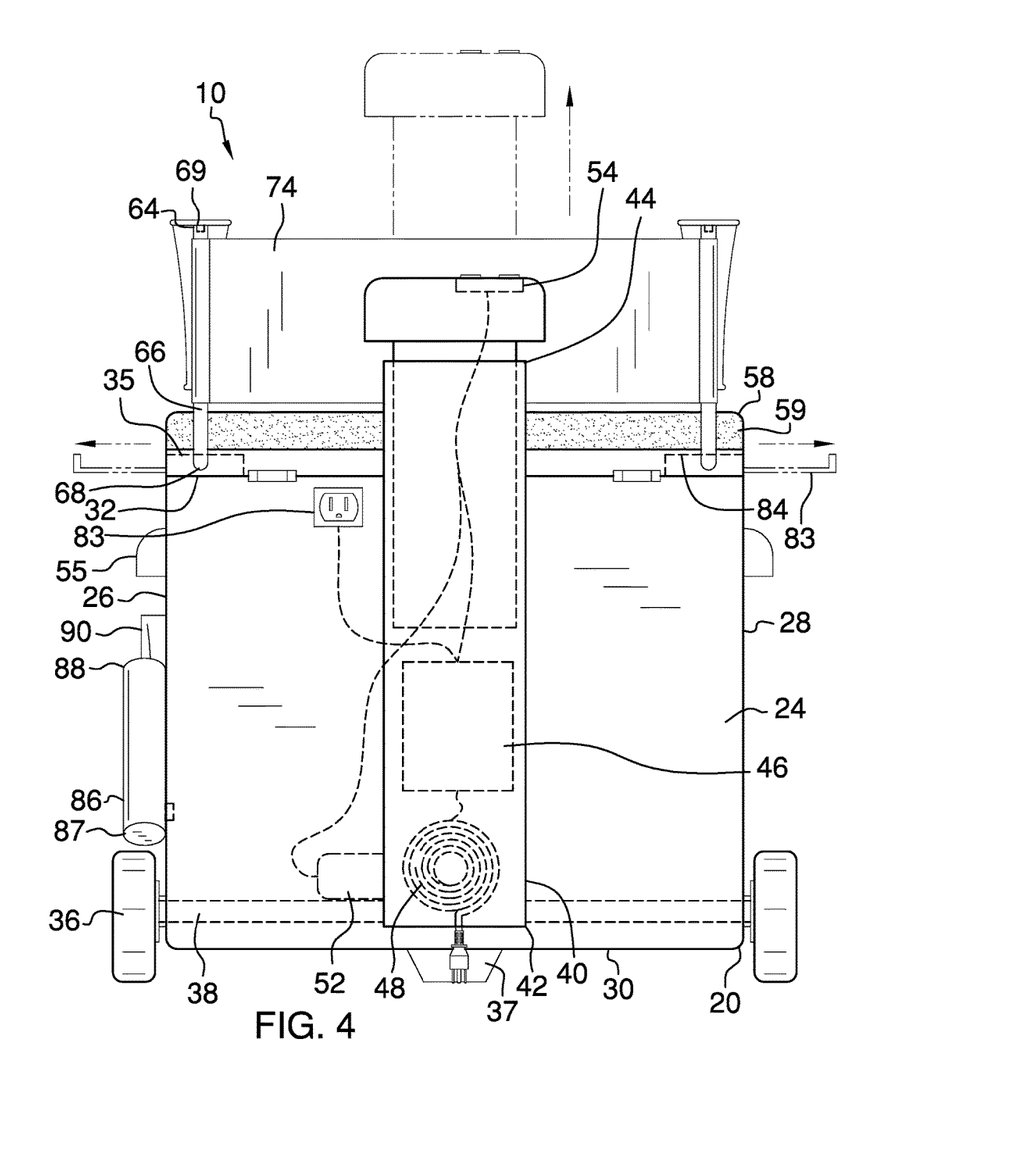
FIG. 4 is a rear elevation view.
Figure 5:
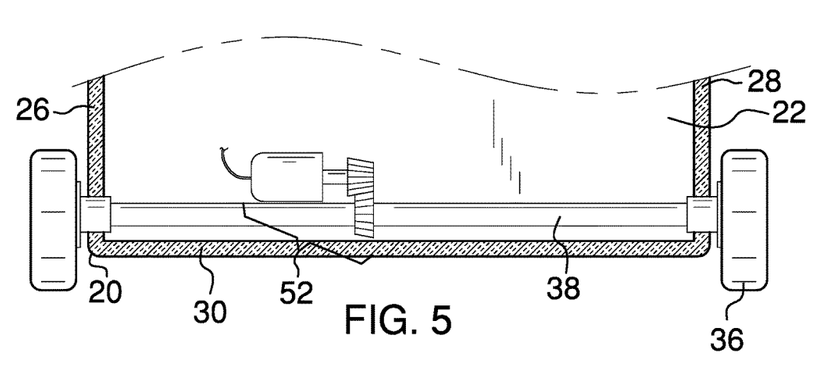
FIG. 5 is a cross-sectional view taken along line 5-5 of FIG. 3.

With reference now to the drawings, and in particular FIGS. 1 through 5 thereof, an example of the instant motorized cooler cart employing the principles and concepts of the present motorized cooler cart and generally designated by the reference number 10 will be described.

Referring to FIGS. 1 through 5, the present motorized cooler cart 10 is illustrated. The motorized cooler cart 10 includes a parallelepiped insulated cooler body 20 having a front side 22, a rear side 24, a right side 26, a left side 28, a bottom side 30, a top perimeter 32. An interior compartment 34 for storage of items within the cooler body 20 is disposed between the front and rear sides 22, 24, the right and left sides 26, 28, the bottom side 30, and the top perimeter 32. The cooler body further has a lid 35 disposed thereon. A lockable latch assembly 39 removably locks the lid 35 to the front side 22. The lockable latch assembly includes a central aperture 41 in the front side 22 proximal the top perimeter 32 and a parallelepiped latch body 43 engageable to the central aperture 41.

A pair of wheels 36 is provided to transport the cooler body 20. One of the pair of wheels 36 is disposed on a respective one of the right side 26 and the left side 28 proximal the bottom side. The wheels 36 are disposed on an axle 38 which is disposed across the entire bottom side 30 proximal the rear side 24. A footing support member 37, disposed on the bottom side 30 proximal the front side 22, assists in maintaining the cooler body 20 in a balanced upright position when the cooler body 20 is in a stopped condition, rather than being moved.

A housing compartment 40 is disposed on the rear side 24. The housing compartment 40 has a lower end 42 proximal the wheels 36 and an upper end 44. A rechargeable battery 46 is disposed within the housing compartment 40 proximal the lower end 42. A retractable power cord 48, disposed between the battery 46 and the lower end 42, is in operational communication with the battery 46. A telescopic handle 50 is disposed between the battery 46 and the upper end 44 when the handle 50 is in a retracted position, but also has an alternate extended position. A drive gear motor 52 is disposed within the lower end 42 of the housing compartment 40. The drive gear motor 52 is in operational communication with each of the pair of wheels 36.

A speed control switch 54, disposed on the telescopic handle 50 for convenient access to control the speed at which the cooler body 20 is moved, is in operational communication with each of the battery 46 and the drive gear motor 52. The speed control switch 54 controls a speed of the drive gear motor 52 and the drive gear motor 52 controls a speed of a rotation of the pair of wheels 46. The speed control switch 54 and the drive gear motor 52 are activated and alternately deactivated when the telescopic handle 50 is in the extended position and in the retracted position, respectively, thus, requiring the user to only guide the cooler body 20.

A pair of carrying handles 55 is provided for manually moving the cooler body 20 from one location to another location. One of the carrying handles 55 is disposed on each of the right side 22 and the left side 24.

A cushioned parallelepiped seat 58 is disposed atop the entire lid 34. The seat 58 has a rear wall 59 and a front wall 60. A backrest 64 is included for the seat 58. The backrest 64 has a pair of spaced apart J-shaped frames 66 hingedly disposed on the rear wall 59 of the seat 58. One of the frames 66 is disposed proximal each of the right side 26 and the left side 28. Each of the pair of J-shaped frames 66 has an internal edge 68 disposed on the rear wall 59, an external edge 69, a central portion 70 disposed between the internal edge 68 and the external edge 69, a convex bend 72 directly between the internal edge 68 and the central portion 70, and a seat back 74 continuously disposed and spanning the frames 66.

An electrical outlet 83 is disposed the rear side 24 of the cooler body 20 proximal the housing compartment 40, the electrical outlet 83 being in operational communication with the battery 46.

An insulated lower support body 76 is continuously disposed along an outer perimeter 77 of the interior compartment 34. The lower support body 76 has a height in a range of one-half to two-thirds a height of the interior compartment 34. A dry storage tray 78, provided for storing items out of water or ice, is removably disposed within the interior compartment 34 directly atop the lower support body 76. The dry storage tray 78 has a bottom wall 79 and a vertical outer wall 80 continuously disposed along an external edge 81 of the bottom wall 79. The bottom wall 79 is continuously disposed directly atop the lower support body 76. A pair of cup holders 83 is also provided. One of the cup holders is extendible from a channel 84 within the lid 35 proximal each of the right side 26 and the left side 28.

A hollow rod holder 86 is disposed on at least one of the right side 26 and the left side 28 of the cooler body 20. The rod holder 86 has a closed bottom end 87 and an open top end 88 with the top end 88 being more proximal the top perimeter 32 and the front side 22 than the bottom end 87. At least one storage pouch 90 is disposed on at least one of the right side 26 and the left side 28 of the cooler body 20.

A slot 91 is disposed on the seat 58 proximal the front wall 60 thereof in a position parallel and proximal each of the right side 26 and the left side 28 of the cooler body 20. A post 92 is slidingly disposed within each slot 91. An armrest 93 has a forward end 94 attachable to the respective post 92 and a rearward end 95 attachable to the external edge 69 of the respective one of the frames 66.

What is claimed is:

1. A motorized cooler cart comprising:
   a parallelepiped insulated cooler body having a front side, a rear side, a right side, a left side, a bottom side, a top perimeter, and an interior compartment disposed between the front and rear sides, the right and left sides, the bottom side, and the top perimeter, the cooler body further having a lid disposed thereon;
   a pair of wheels, one of the pair of wheels being disposed on a respective one of the right side and the left side proximal the bottom side, the wheels being disposed on an axle, the axle being disposed across the entire bottom side proximal the rear side;
   a footing support member disposed on the bottom side proximal the front side; a lockable latch assembly configured to lock the lid to the front side;
   a housing compartment disposed on the rear side, the housing compartment having a lower end proximal the wheels and an upper end;
   a rechargeable battery disposed within the housing compartment proximal the lower end;
   a retractable power cord disposed between the battery and the lower end, the power cord being in operational communication with the battery;
   a telescopic handle disposed between the battery and the upper end when the handle is in a retracted position, the handle having an alternate extended position;
   a drive gear motor disposed within the lower end of the housing compartment, the drive gear motor being in operational communication with each of the pair of wheels;
   a speed control switch disposed on the telescopic handle, the speed control switch being in operational communication with each of the battery and the drive gear motor, wherein the speed control switch controls a speed of the drive gear motor and the drive gear motor controls a speed of a rotation of the pair of wheels;
   a pair of carrying handles, one carrying handle being disposed on each of the right side and the left side;
   wherein the speed control switch and the drive gear motor are activated and alternately deactivated when the telescopic handle is in the extended position and in the retracted position, respectively; and
   a pair of cup holders, one of the cup holders extendible from a channel within the lid proximal each of the right side and the left side.

2. The motorized cooler cart of claim 1 comprising;
   an electrical outlet disposed the rear side of the cooler body proximal the housing compartment, the electrical outlet being in operational communication with the battery.

3. The motorized cooler cart of claim 1 comprising:
   a hollow rod holder disposed on at least one of the right side and the left side of the cooler body, the rod holder having a closed bottom end and an open top end, the top end being more proximal the top perimeter and the front side than the bottom end.

4. The motorized cooler cart of claim 1 comprising:
   at least one storage pouch disposed on at least one of the right side and the left side of the cooler body.

5. The motorized cooler cart of claim 1 wherein the lockable latch assembly comprises a central aperture in the front side proximal the top perimeter and a parallelepiped latch body engageable to the central aperture.

6. A motorized cooler cart comprising:
   a parallelepiped insulated cooler body having a front side, a rear side, a right side, a left side, a bottom side, a top perimeter, and an interior compartment disposed between the front and rear sides, the right and left sides, the bottom side, and the top perimeter, the cooler body further having a lid disposed thereon;
   a pair of wheels, one of the pair of wheels being disposed on a respective one of the right side and the left side proximal the bottom side, the wheels being disposed on an axle, the axle being disposed across the entire bottom side proximal the rear side;
   a footing support member disposed on the bottom side proximal the front side; a lockable latch assembly configured to lock the lid to the front side;

a housing compartment disposed on the rear side, the housing compartment having a lower end proximal the wheels and an upper end;

a rechargeable battery disposed within the housing compartment proximal the lower end;

a retractable power cord disposed between the battery and the lower end, the power cord being in operational communication with the battery;

a telescopic handle disposed between the battery and the upper end when the handle is in a retracted position, the handle having an alternate extended position;

a drive gear motor disposed within the lower end of the housing compartment, the drive gear motor being in operational communication with each of the pair of wheels;

a speed control switch disposed on the telescopic handle, the speed control switch being in operational communication with each of the battery and the drive gear motor, wherein the speed control switch controls a speed of the drive gear motor and the drive gear motor controls a speed of a rotation of the pair of wheels;

a pair of carrying handles, one carrying handle being disposed on each of the right side and the left side;

wherein the speed control switch and the drive gear motor are activated and alternately deactivated when the telescopic handle is in the extended position and in the retracted position, respectively;

a cushioned parallelepiped seat disposed atop the entire lid, the seat having a rear wall and a front wall; and a backrest having a pair of spaced apart J-shaped frames hingedly disposed on the rear wall of the seat, one of the frames being disposed proximal each of the right side and the left side, each of the pair of J-shaped frames having an internal edge disposed on the rear wall, an external edge, a central portion disposed between the internal edge and the external edge, a convex bend directly between the internal edge and the central portion, and a seat back continuously disposed and spanning the frames.

7. A motorized cooler cart comprising:

a parallelepiped insulated cooler body having a front side, a rear side, a right side, a left side, a bottom side, a top perimeter, and an interior compartment disposed between the front and rear sides, the right and left sides, the bottom side, and the top perimeter, the cooler body further having a lid disposed thereon;

a pair of wheels, one of the pair of wheels being disposed on a respective one of the right side and the left side proximal the bottom side, the wheels being disposed on an axle, the axle being disposed across the entire bottom side proximal the rear side;

a footing support member disposed on the bottom side proximal the front side; a lockable latch assembly configured to lock the lid to the front side;

a housing compartment disposed on the rear side, the housing compartment having a lower end proximal the wheels and an upper end;

a rechargeable battery disposed within the housing compartment proximal the lower end;

a retractable power cord disposed between the battery and the lower end, the power cord being in operational communication with the battery;

a telescopic handle disposed between the battery and the upper end when the handle is in a retracted position, the handle having an alternate extended position;

a drive gear motor disposed within the lower end of the housing compartment, the drive gear motor being in operational communication with each of the pair of wheels;

a speed control switch disposed on the telescopic handle, the speed control switch being in operational communication with each of the battery and the drive gear motor, wherein the speed control switch controls a speed of the drive gear motor and the drive gear motor controls a speed of a rotation of the pair of wheels;

a pair of carrying handles, one carrying handle being disposed on each of the right side and the left side;

wherein the speed control switch and the drive gear motor are activated and alternately deactivated when the telescopic handle is in the extended position and in the retracted position, respectively;

an insulated lower support body continuously disposed along an outer perimeter of the interior compartment, the lower support body having a height in a range of one-half to two-thirds a height of the interior compartment; and a dry storage tray removably disposed within the interior compartment directly atop the lower support body, the dry storage tray having a bottom wall and a vertical outer wall continuously disposed along an external edge of the bottom wall, the bottom wall continuously disposed directly atop the lower support body.

8. A motorized cooler cart comprising:

a parallelepiped insulated cooler body having a front side, a rear side, a right side, a left side, a bottom side, a top perimeter, and an interior compartment disposed between the front and rear sides, the right and left sides, the bottom side, and the top perimeter, the cooler body further having a lid disposed thereon;

a pair of wheels, one of the pair of wheels being disposed on a respective one of the right side and the left side proximal the bottom side, the wheels being disposed on an axle, the axle being disposed across the entire bottom side proximal the rear side;

a footing support member disposed on the bottom side proximal the front side; a lockable latch assembly configured to lock the lid to the front side;

a housing compartment disposed on the rear side, the housing compartment having a lower end proximal the wheels and an upper end;

a rechargeable battery disposed within the housing compartment proximal the lower end;

a retractable power cord disposed between the battery and the lower end, the power cord being in operational communication with the battery;

a telescopic handle disposed between the battery and the upper end when the handle is in a retracted position, the handle having an alternate extended position;

a drive gear motor disposed within the lower end of the housing compartment, the drive gear motor being in operational communication with each of the pair of wheels;

a speed control switch disposed on the telescopic handle, the speed control switch being in operational communication with each of the battery and the drive gear motor, wherein the speed control switch controls a speed of the drive gear motor and the drive gear motor controls a speed of a rotation of the pair of wheels;

a pair of carrying handles, one carrying handle being disposed on each of the right side and the left side;

wherein the speed control switch and the drive gear motor are activated and alternately deactivated when the telescopic handle is in the extended position and in the retracted position, respectively;

a slot disposed on the seat proximal the front wall thereof in a position parallel and proximal each of the right side and the left side of the cooler body;

a post slidingly disposed within each slot; and an armrest having a forward end attachable to the respective post and a rearward end attachable to the external edge of the respective one of the frames.

9. A motorized cooler cart comprising:

a parallelepiped insulated cooler body having a front side, a rear side, a right side, a left side, a bottom side, a top perimeter, and an interior compartment disposed between the front and rear sides, the right and left sides, the bottom side, and the top perimeter, the cooler body further having a lid disposed thereon;

a pair of wheels, one of the pair of wheels being disposed on a respective one of the right side and the left side proximal the bottom side, the wheels being disposed on an axle, the axle being disposed across the entire bottom side proximal the rear side;

a footing support member disposed on the bottom side proximal the front side; a lockable latch assembly configured to lock the lid to the front side;

a housing compartment disposed on the rear side, the housing compartment having a lower end proximal the wheels and an upper end;

a rechargeable battery disposed within the housing compartment proximal the lower end;

a retractable power cord disposed between the battery and the lower end, the power cord being in operational communication with the battery;

a telescopic handle disposed between the battery and the upper end when the handle is in a retracted position, the handle having an alternate extended position;

a drive gear motor disposed within the lower end of the housing compartment, the drive gear motor being in operational communication with each of the pair of wheels; and a speed control switch disposed on the telescopic handle, the speed control switch being in operational communication with each of the battery and the drive gear motor, wherein the speed control switch controls a speed of the drive gear motor and the drive gear motor controls a speed of a rotation of the pair of wheels;

a pair of carrying handles, one carrying handle being disposed on each of the right side and the left side;

a cushioned parallelepiped seat disposed atop the entire lid, the seat having a rear wall and a front wall;

a backrest having a pair of spaced apart J-shaped frames hingedly disposed on the rear wall of the seat, one of the frames being disposed proximal each of the right side and the left side, each of the pair of J-shaped frames having an internal edge disposed on the rear wall, an external edge, a central portion disposed between the internal edge and the external edge, a convex bend directly between the internal edge and the central portion, and a seat back continuously disposed and spanning the frames;

an insulated lower support body continuously disposed along an outer perimeter of the interior compartment, the lower support body having a height in a range of one-half to two-thirds a height of the interior compartment; and a dry storage tray removably disposed within the interior compartment directly atop the lower support body, the dry storage tray having a bottom wall and a vertical outer wall continuously disposed along an external edge of the bottom wall, the bottom wall continuously disposed directly atop the lower support body;

a pair of cup holders, one of the cup holders extendible from a channel within the lid proximal each of the right side and the left side;

a slot disposed on the seat proximal the front wall thereof in a position parallel and proximal each of the right side and the left side of the cooler body;

a post slidingly disposed within each slot; and an armrest having a forward end attachable to the respective post and a rearward end attachable to the external edge of the respective one of the frames;

wherein the speed control switch and the drive gear motor are activated and alternately deactivated when the telescopic handle is in the extended position and in the retracted position, respectively.

10. The motorized cooler cart of claim 9 comprising:

an electrical outlet disposed the rear side of the cooler body proximal the housing compartment, the electrical outlet being in operational communication with the battery.

11. The motorized cooler cart of claim 9 comprising:

a hollow rod holder disposed on at least one of the right side and the left side of the cooler body, the rod holder having a closed bottom end and an open top end, the top end being more proximal the top perimeter and the front side than the bottom end.

12. The motorized cooler cart of claim 9 comprising:

at least one storage pouch disposed on at least one of the right side and the left side of the cooler body.

13. The motorized cooler cart of claim 9 wherein the lockable latch assembly comprises a central aperture in the front side proximal the top perimeter and a parallelepiped latch body engageable to the central aperture.

* * * * *